United States Patent
Sato et al.

(10) Patent No.: US 11,560,637 B2
(45) Date of Patent: Jan. 24, 2023

(54) ELECTROLYTIC REDUCTION DEVICE AND ELECTROLYTIC REDUCTION METHOD

(71) Applicant: Nippon Telegraph and Telephone Corporation, Tokyo (JP)

(72) Inventors: Sayumi Sato, Musashino (JP); Yuya Uzumaki, Musashino (JP); Yoko Ono, Musashino (JP); Takeshi Komatsu, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/057,515

(22) PCT Filed: May 17, 2019

(86) PCT No.: PCT/JP2019/019634
§ 371 (c)(1),
(2) Date: Nov. 20, 2020

(87) PCT Pub. No.: WO2019/225495
PCT Pub. Date: Nov. 28, 2019

(65) Prior Publication Data
US 2021/0198796 A1   Jul. 1, 2021

(30) Foreign Application Priority Data
May 22, 2018  (JP) ............... JP2018-098084

(51) Int. Cl.
*C25B 15/02* (2021.01)
*C25B 9/19* (2021.01)
*C25B 15/00* (2006.01)

(52) U.S. Cl.
CPC ............... *C25B 15/02* (2013.01); *C25B 9/19* (2021.01); *C25B 15/00* (2013.01)

(58) Field of Classification Search
None
See application file for complete search history.

(56) References Cited

U.S. PATENT DOCUMENTS

| 3,449,225 | A | * | 6/1969 | Matzner | .................. | C07C 71/00 |
| | | | | | | 205/426 |
| 2012/0018311 | A1 | * | 1/2012 | Yotsuhashi | ............... | C25B 3/25 |
| | | | | | | 205/555 |
| 2012/0067719 | A1 | * | 3/2012 | Lagos Lehuede | ........ | C25C 7/00 |
| | | | | | | 204/229.4 |

FOREIGN PATENT DOCUMENTS

| JP | H08-296077 A | 11/1996 |
| JP | 2019-203193 A | 11/2019 |

(Continued)

OTHER PUBLICATIONS

Shiratsuchi et al, Pulsed Electroreduction of CO2 on Copper Electrodes, Journal of the Electrochemical Society, vol. 140, No. 12, Dec. 1993, pp. 3479-3482 (Year: 1993).*

(Continued)

*Primary Examiner* — Harry D Wilkins, III
(74) *Attorney, Agent, or Firm* — Workman Nydegger

(57) ABSTRACT

To improve the efficiency of a reduction reaction. A power source applies a voltage to an oxidation electrode immersed in an aqueous solution in an oxidation tank and a reduction electrode immersed in an aqueous solution in a reduction tank, the voltage having a voltage value that changes with a predetermined cycle to be a voltage value at which ions can be desorbed from a surface of the oxidation electrode and a surface of the reduction electrode during one cycle of the voltage change. The frequency of the voltage is set within a range of 10 Hz to 1 kHz.

1 Claim, 3 Drawing Sheets

(56) References Cited

FOREIGN PATENT DOCUMENTS

KR     20180020763 A     2/2018
WO     WO 98/58452 A1 * 11/1999   .......... C02F 1/46109

OTHER PUBLICATIONS

Kimura et al, Controlled Selectivity of CO2 Reduction on Copper by Pulsing the Electrochemical Potential, Chem SUS Chem, vol. 11, No. 11, May 2018, pp. 1781-1786 (Year: 2018).*

Yano et al, Pulse-mode electrochemical reduction of carbon dioxide using copper and copper oxide electrodes for selective ethylene formation, Journal of Applied Electrochemistry, vol. 38, Jul. 2008, pp. 1721-1726 (Year: 2008).*

International Search Report dated Jul. 16, 2019, issued in PCT Application No. PCT/JP2019/019634, filed May 17, 2019.

Y. Hori et al., *Formation of Hydrocarbons in the Electrochemical Reduction of Carbon Dioxide at a Cooper Electrode in Aqueous Solution*, Journal of the Chemical Society Faraday Transactions, No. 85(8), 1989, pp. 2309-2326.

H. Zhong et al., Effect of *$KHCO_3$ Concentration of Electrochemical Reduction of $CO_2$ on Copper Electrode*, Journal of the Electrochemical Society, vol. 164, No. 9, 2017, pp. F923-F927.

* cited by examiner

ELECTROLYTIC REDUCTION DEVICE AND ELECTROLYTIC REDUCTION METHOD

TECHNICAL FIELD

The present invention relates to an electrolytic reduction technique for performing a proton or gas reduction reaction.

BACKGROUND ART

A conventional electrolytic reduction device is configured such that an oxidation tank in which an oxidation electrode is immersed in an aqueous solution and a reduction tank in which a reduction electrode is immersed in an aqueous solution are connected via a proton exchange membrane, and carbon dioxide is constantly supplied to the reduction tank via a tube. By connecting a power source between the electrodes and applying a constant DC voltage which has a value high enough for reactions of the oxidation electrode and the reduction electrode to proceed, protons and carbon dioxides are reduced on the reduction electrode side to produce hydrogen, carbon oxide, methane, ethylene, methanol, ethanol, and formic acid.

CITATION LIST

Non-Patent Literature

Non-Patent Literature 1: Y. Hori, et al., "Formation of Hydrocarbons in the Electrochemical Reduction of Carbon Dioxide at a Copper Electrode in Aqueous Solution", Journal of the Chemical Society, 1989, 85(8), 2309-2326

Non-Patent Literature 2: H. Zhong, et al., "Effect of $KHCO_3$ Concentration on Electrochemical Reduction of $CO_2$ on Copper Electrode", Journal of The Electrochemical Society, 2017, 164(9), F923-F927

SUMMARY OF THE INVENTION

Technical Problem

However, in the conventional electrolytic reduction device, there is a problem that, when the reaction proceeds, ions such as protons and $HCOO^-$ are adsorbed on the surface of the reduction electrode, and these ions reduce a reaction area of the reduction electrode and suppress the reduction reaction. In order to improve the efficiency of the reduction reaction, it is necessary to desorb ions adsorbed on the surface of the reduction electrode and reduce the loss of the reaction surface area of the reduction electrode.

The present invention has been made in view of the above, and aims to improve the efficiency of the reduction reaction.

Means for Solving the Problem

An electrolytic reduction device according to the present invention passes an electric current between an oxidation electrode and a reduction electrode to cause a reduction reaction in the reduction electrode, and includes an oxidation tank for immersing and disposing the oxidation electrode in an aqueous solution, a reduction tank for immersing and disposing the reduction electrode in an aqueous solution, a proton exchange membrane disposed between the oxidation tank and the reduction tank, and a power source connected to the oxidation electrode and the reduction electrode, in which the power source applies a voltage to the oxidation electrode and the reduction electrode, the voltage having a voltage value that changes with a predetermined cycle to be a voltage value at which ions can be desorbed from a surface of the oxidation electrode and a surface of the reduction electrode during one cycle of the voltage change.

An electrolytic reduction method according to the present invention passes an electric current between an oxidation electrode and a reduction electrode to cause a reduction reaction in the reduction electrode, and a voltage is applied to the oxidation electrode and the reduction electrode, the voltage having a voltage value that changes with a predetermined cycle to be a voltage value at which ions can be desorbed from a surface of the oxidation electrode and a surface of the reduction electrode during one cycle of the voltage change.

Effects of the Invention

According to the present invention, the efficiency of the reduction reaction can be improved.

DESCRIPTION OF EMBODIMENTS

Hereinafter, embodiments of the present invention will be described with reference to the drawings. The present invention is not limited to the following examples, and modifications may be made without departing from the spirit of the present invention.

Figure 1:
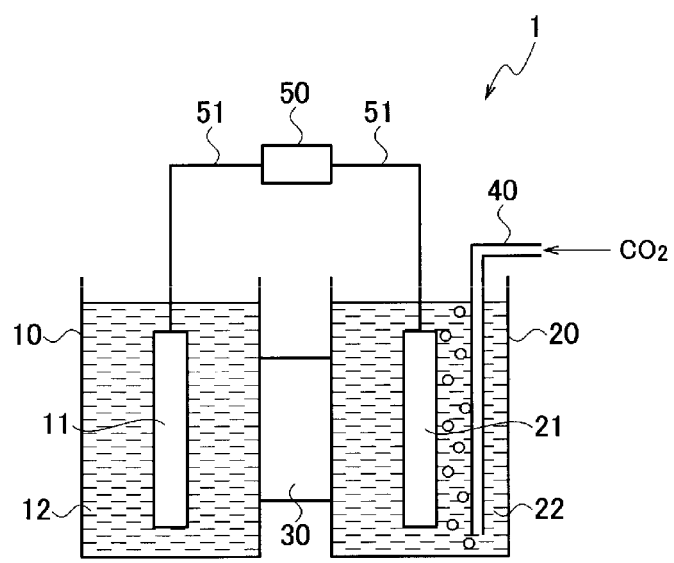
FIG. 1 is a schematic structural diagram that shows a structure of an electrolytic reduction device according to the present embodiment.

FIG. 1 is a schematic structural diagram showing a structure of an electrolytic reduction device in the present embodiment. An electrolytic reduction device 1 of the present embodiment includes an oxidation tank 10, a reduction tank 20, a proton exchange membrane 30 that allows protons to move between the oxidation tank 10 and the reduction tank 20, a tube 40 that supplies carbon dioxide, and a power source 50 that applies an AC voltage to the oxidation electrode 11 and the reduction electrode 21.

An aqueous solution 12 is put in the oxidation tank 10, and the oxidation electrode 11 is immersed in the aqueous solution 12. The oxidation electrode 11 is electrically connected to the power source 50 by a conductor wire 51. For the oxidation electrode 11, for example, platinum, gold, silver, copper, indium, and nickel can be used. As the aqueous solution 12, for example, an aqueous solution of sodium hydroxide, an aqueous solution of potassium chloride, and an aqueous solution of sodium chloride can be used.

An aqueous solution 22 is put into the reduction tank 20, and the reduction electrode 21 is immersed in the aqueous solution 22. The reduction electrode 21 is electrically connected to the power source 50 by the conductor wire 51. The reduction electrode 21 is a plate-like metal, for which copper, gold, platinum, silver, palladium, gallium, indium, nickel, tin, and cadmium can be used, for example. The reduction electrode 21 may be a wire mesh or an electrode substrate obtained by applying particulate metal particles to a conductive substrate. As the aqueous solution 22, for example, an aqueous solution of potassium hydrogen carbonate, an aqueous solution of potassium chloride, and an aqueous solution of sodium hydroxide can be used.

For the proton exchange membrane 30, for example, Nafion (registered trademark) can be used. Nafion is a perfluorocarbon material composed of a hydrophobic Teflon skeleton formed of carbon-fluorine and a perfluoro side chain having a sulfonic acid group.

The tube 40 supplies carbon dioxide from near the bottom of the reduction tank 20. By changing the gas supplied to the reduction tank 20, it is possible to generate hydrogen by a proton reduction or ammonia by a nitrogen reduction reaction.

The power source 50 only needs to apply a predetermined AC voltage to the oxidation electrode 11 and the reduction electrode 21. For example, the power source 50 may be a combination of a function generator and an amplifier.

Consider a voltage when hydrogen is generated using an aqueous solution having a pH of 13.0 in the oxidation tank 10 and an aqueous solution having a pH of 8.5 in the reduction tank 20. At the oxidation electrode 11, an oxidation reaction of water ($2H_2O \rightarrow O_2 + 4H^+ + 4e^-$) is generated. The oxidation reaction potential in the aqueous solution having a pH of 13.0 is approximately 0.46 V vs. SHE (Standard Hydrogen Electrode). At the reduction electrode 21, a proton reduction reaction ($2H^+ + 2e^- \rightarrow H_2$) is generated. The reduction reaction potential in the aqueous solution having a pH of 8.5 is approximately $-0.50$ V vs. SHE. Therefore, it is understood that an applied voltage of approximately 0.96 V or more is required in principle to advance the oxidation-reduction reaction for the purpose of hydrogen generation.

Figure 2A:
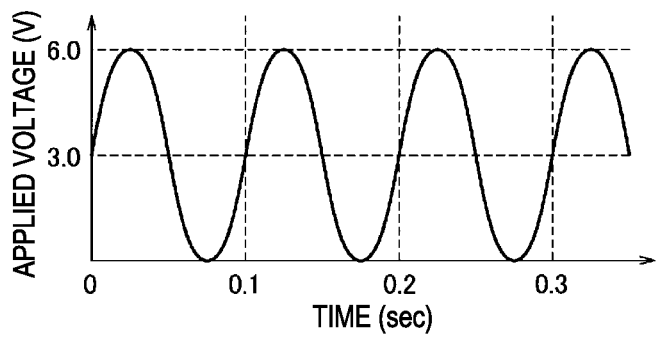
FIG. 2 is a diagram that shows examples of waveforms of a voltage applied to an electrode of the electrolytic reduction device.

In the present embodiment, as shown in FIG. 2(a), an AC voltage with an amplitude of 6.0 Vpp, which has a voltage value of 3.0 V, a maximum value of 6.0 V, and a minimum value of 0 V, is applied. The frequency is set as 10 Hz. In applying the AC voltage, when a voltage value reaches a minimum value of 0 V during one cycle, a coulomb attraction to the reduction electrode acting on ions disappears and the ions on the electrode surface are desorbed. It has been experimentally confirmed that ions can respond to the electric field when the frequency of the applied voltage is in the range of 10 Hz to 1 kHz. When the frequency is less than 10 Hz, the yield of the produced gas per unit time is deteriorated. When the frequency is higher than 1 kHz, the frequency of the AC voltage is too high for the ions on the electrode surface to respond to the AC electric field, and for this reason, the effect of the present invention is considered to be weakened.

Figure 2B:
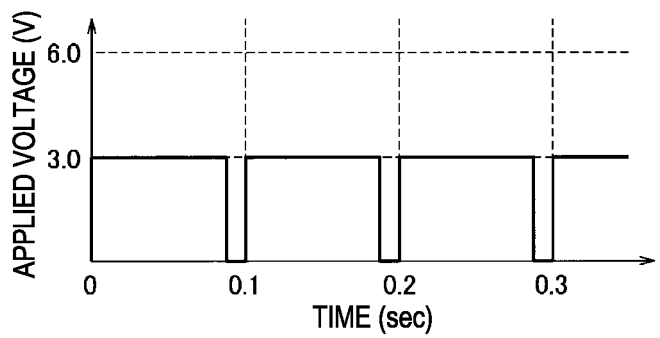
Figure 2C:
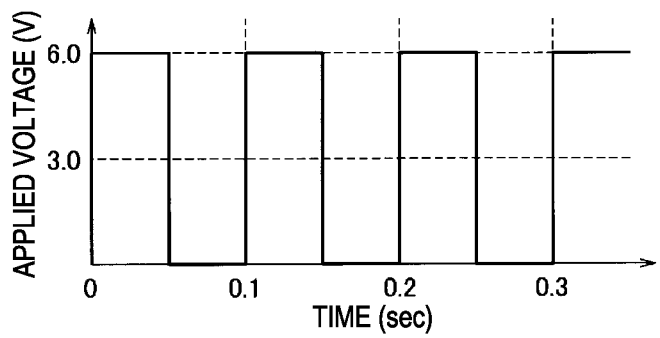

As for the applied voltage, it should be noted that a voltage having a periodic rectangular waveform as shown in FIG. 2(b) or 2(c) may be used instead of the AC voltage shown in FIG. 2(a). Since it is sufficient if ions are desorbed from the reduction electrode in one cycle of the applied voltage, a voltage having any waveform may be used as long as it reaches a minimum value in the range of $-0.3$ V to 0.3 V in one cycle.

When the setting condition of AC voltage is changed, selectivity of types of the generated gas ($CO$, $HCOOH$, $CH_4$, $C_2H_4$, and the like) can be controlled.

Figure 3:
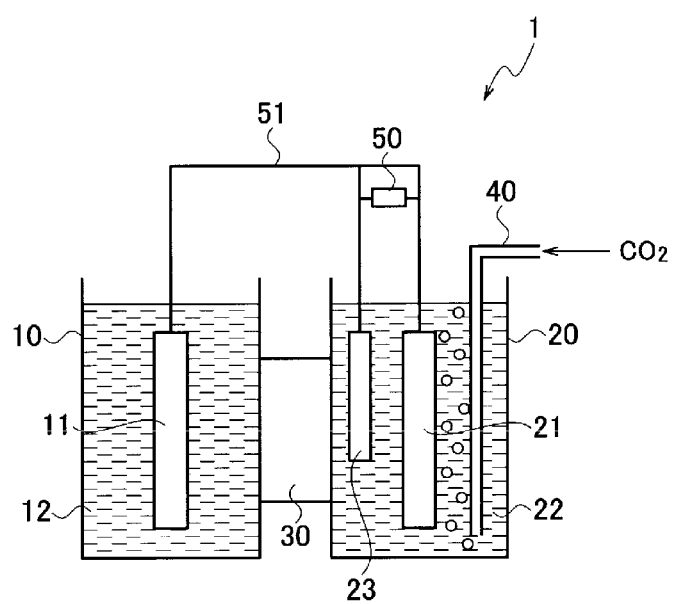
FIG. 3 is a schematic structural diagram that shows a structure of another electrolytic reduction device according to the present embodiment.

FIG. 3 is a schematic structural diagram showing a structure of another electrolytic reduction device in the present embodiment.

An electrolytic reduction device 1 of FIG. 3 differs from the electrolytic reduction device 1 of FIG. 1 in that a reference electrode 23 is disposed in a reduction tank 20, and a power source 50 is provided between a reduction electrode 21 and the reference electrode 23. As shown in FIG. 3, an AC voltage may be applied between the reduction electrode 21 and the reference electrode 23.

Example and Evaluation Results

Next, an example of the electrolytic reduction device of the present embodiment and a comparative example in which a DC voltage is applied will be described.

Example

In the example, an external power source (a combination of a 1287 type potentiogalvanostat and a 1260 type impedance analyzer manufactured by Solartron) was connected to the oxidation electrode 11 and the reduction electrode 21 of the electrolytic reduction device 1 shown in FIG. 1, and an AC voltage having a DC voltage value of 3.0 V, an amplitude of 6.0 Vpp, and a frequency of 10 Hz was applied.

Platinum (produced by The Nilaco Corporation) was used for the oxidation electrode 11, which was installed in the oxidation tank 10 such that approximately 0.55 cm² of the surface area was immersed in the aqueous solution 12.

The aqueous solution 12 was a 1 mol/l aqueous solution of sodium hydroxide.

As the reduction electrode 21, a copper plate (produced by The Nilaco Corporation) was used whose surface was washed with pure water and dried after being cut into 2 cm×3 cm. The reduction electrode 21 was installed such that the copper plate as a whole was immersed in the aqueous solution 22.

The aqueous solution 22 was a 0.5 mol/l aqueous solution of potassium hydrogen carbonate.

Nafion (registered trademark) was used for the proton exchange membrane 30.

Carbon dioxide was supplied to the reduction tank 20 through the tube 40 at a flow rate of 20 ml/min and at a pressure of 0.18 MPa.

The aqueous solution was stirred by rotating a stirring bar at a speed of 250 rpm in the center of the bottom of each reaction tank.

After supplying helium to the oxidation tank 10 and carbon dioxide to the reduction tank 20, which is followed by sufficient substitution, an AC voltage was applied to the oxidation electrode 11 and the reduction electrode 21 to pass an electric current.

Gases in the oxidation tank 10 and the reduction tank 20 were collected at an arbitrary time during the voltage application, and the reaction products were analyzed with a gas chromatograph. It was confirmed that oxygen was generated in the oxidation tank 10. It was confirmed that hydrogen, carbon monoxide, methane, and ethylene were generated in the reduction tank 20.

Comparative Example

A comparative example differs from the example in that the voltage applied to the oxidation electrode 11 and the reduction electrode 21 was a DC voltage of 3.0 V. Otherwise, the comparative example was the same as the example.

Evaluation Results

When the reduction reaction products were measured during the voltage application in the example, the efficiency of proton and carbon dioxide reductions was improved as compared with the comparative example. Table 1 below shows current values during the voltage application as well as the Faraday efficiency of material generation by proton and carbon dioxide reductions in the example and the comparative example. The Faraday efficiency indicates a ratio of a current value used for a reduction reaction with respect to a current value passing through a conductor wire during the voltage application.

TABLE 1

|  | Current Value (mA) | Faraday Efficiency (%) |
|---|---|---|
| Example | 232 | 83 |
| Comparative Example | 21 | 82 |

In the example, the current value increased approximately 10 times compared to the comparative example, and the Faraday efficiency was comparable. This indicates that the reduction reaction products such as hydrogen, carbon monoxide, methane, and ethylene increased approximately 10 times.

As described above, according to the present embodiment, the power source 50 applies a voltage to the oxidation electrode 11 immersed in the aqueous solution 12 in the oxidation tank 10 and the reduction electrode 21 immersed in the aqueous solution 22 in the reduction tank 20, which has a voltage value that changes with a predetermined cycle to be a voltage value at which ions can be desorbed from a surface of the oxidation electrode 11 and a surface of the reduction electrode 21 during one cycle of the voltage change, so that ions absorbed on the surface of the reduction electrode 21 can be desorbed and the loss of the reaction surface area of the reduction electrode 21 can be reduced, thereby enabling improvement in the efficiency of the electrolytic reduction reaction of protons or carbon dioxides.

REFERENCE SIGNS LIST

1 Electrolytic reduction device
10 Oxidation tank
11 Oxidation electrode
12 Aqueous solution
20 Reduction tank
21 Reduction electrode
22 Aqueous solution
23 Reference electrode
30 Proton exchange membrane
40 Tube
50 Power source
51 Conductor wire

The invention claimed is:

1. An electrolytic reduction device in which an electric current is passed between an oxidation electrode and a reduction electrode to cause a reduction reaction in the reduction electrode, comprising:
an oxidation tank for immersing and disposing the oxidation electrode in an aqueous solution;
a reduction tank for immersing and disposing the reduction electrode in an aqueous solution;
a proton exchange membrane disposed between the oxidation tank and the reduction tank; and
a power source connected to the oxidation electrode and the reduction electrode;
wherein the power source applies a voltage to the oxidation electrode and the reduction electrode, the voltage having a voltage value that changes with a predetermined cycle to be a voltage value at which ions can be desorbed from a surface of the oxidation electrode and a surface of the reduction electrode during one cycle of the voltage change,
wherein a reference electrode is disposed in the reduction tank, the power source being electrically coupled between the reduction electrode and the reference electrode,
wherein the voltage is an AC voltage with an amplitude of 6.0 volts peak-to-peak (Vpp) having a maximum value of 6.0 volts and a minimum value of 0 volts, and a 3.0 DC voltage, and
wherein a frequency of the voltage is in a range of 60 Hz to 1 kHz.

* * * * *